United States Patent

Risser et al.

[11] Patent Number: 5,931,411
[45] Date of Patent: Aug. 3, 1999

[54] HOVERING AIRCRAFT

[75] Inventors: James E. Risser, Princeton Junction, N.J.; William F. Putman, Dongan Hills, N.Y.

[73] Assignee: Aereon Corporation, Princeton, N.J.

[21] Appl. No.: 08/991,560

[22] Filed: Dec. 16, 1997

Related U.S. Application Data

[60] Provisional application No. 60/032,383, Dec. 19, 1996.
[51] Int. Cl.[6] .............................. B64B 1/20; B64B 1/34; B64C 27/22
[52] U.S. Cl. .................. 244/17.11; 244/11; 244/12.3; 244/26; 244/28
[58] Field of Search ............................ 244/5, 6, 11, 12.3, 244/12.5, 25, 26, 28, 30, 17.11

[56] References Cited

U.S. PATENT DOCUMENTS

| | | |
|---|---|---|
| 1,419,962 | 6/1922 | Denham . |
| 2,389,798 | 11/1945 | Main . |
| 2,717,131 | 9/1955 | Barrett . |
| 3,976,265 | 8/1976 | Doolittle ................................ 244/26 |
| 4,482,110 | 11/1984 | Crimmins, Jr. ........................ 244/26 |
| 5,082,205 | 1/1992 | Caufman ............................... 244/26 |

*Primary Examiner*—Virna Lissi Mojica
*Attorney, Agent, or Firm*—Howson and Howson

[57] ABSTRACT

In a novel hovering aircraft, an airfoil blade structure rotatable about a vertical axis comprises a set of upper blades and a set of lower blades, all having variable lift, the upper blades converging toward the lower blades from root to tip. Struts, located inboard of the blade tips, keep the tips of the upper and lower blades separate from each other to reduce interference effects, and also support motors and propellers.

9 Claims, 5 Drawing Sheets

HOVERING AIRCRAFT

CROSS-REFERENCE TO RELATED APPLICATION

This is a continuation in part of our provisional application Ser. No. 60/032,383, filed Dec. 19, 1996.

BACKGROUND OF THE INVENTION

This invention relates to specialized aircraft having a hovering capability, and useful for applications such as aerial observation, aerial logging, etc.

A semi-buoyant composite aircraft for aerial logging is described in U.S. Pat. No. 5,082,205. The semi-buoyant aircraft comprises a large non-rotating balloon surrounded by a rotatable frame carrying propellers, and adjustable horizontal and vertical airfoils. A non-buoyant airborne Station Keeping Optical Observation Platform (SKOOP) also has been proposed as an aircraft having the capabilities of efficient hovering and precision station keeping. The SKOOP combines a conventional helicopter type main rotor with vertical airfoil surfaces mounted at the tip of each main rotor blade for direct force control in the horizontal plane to provide precision positioning capability, which cannot be achieved easily by a conventional helicopter.

A disadvantage of the hybrid aerial logging aircraft, and of the SKOOP, is that the vertical surfaces, along with the required bracing cables, substantially increase the aircraft's profile power losses.

This invention addresses the foregoing problems by an aircraft which combines two main rotors, preferably with one coned and the other drooped, positioned one above the other and joined at a radial station. This configuration provides a hovering aircraft with efficient direct horizontal and vertical force control without necessitating large pitch and roll attitude changes as with helicopters.

DETAILED DESCRIPTION

For convenience, the invention will be referred to by the term "VectoRotor." The VectoRotor can be visualized in either of two ways.

First, it can be viewed as two helicopter rotors, each with its blades fixed at some coned or drooped position. (Coning or drooping describes a condition in which all blades are positioned with their tips an equal amount above (coned) or below (drooped) the blade roots.) The two rotors are positioned one above the other with upper and lower blades joined at a location spaced radially from the axis of rotation. As with a conventional helicopter rotor, the concept does not entail a specified number of blades except that the number of blades should be the same for the upper and lower rotors. Alternatively, the VectoRotor can be viewed as composed of blade pairs. Each blade pair consists of an upper and a lower blade, each with a certain cone or droop angle, located vertically above one another and joined at a radial station. The VectoRotor consists of at least two blade pairs and preferably at least three.

Figure 1:
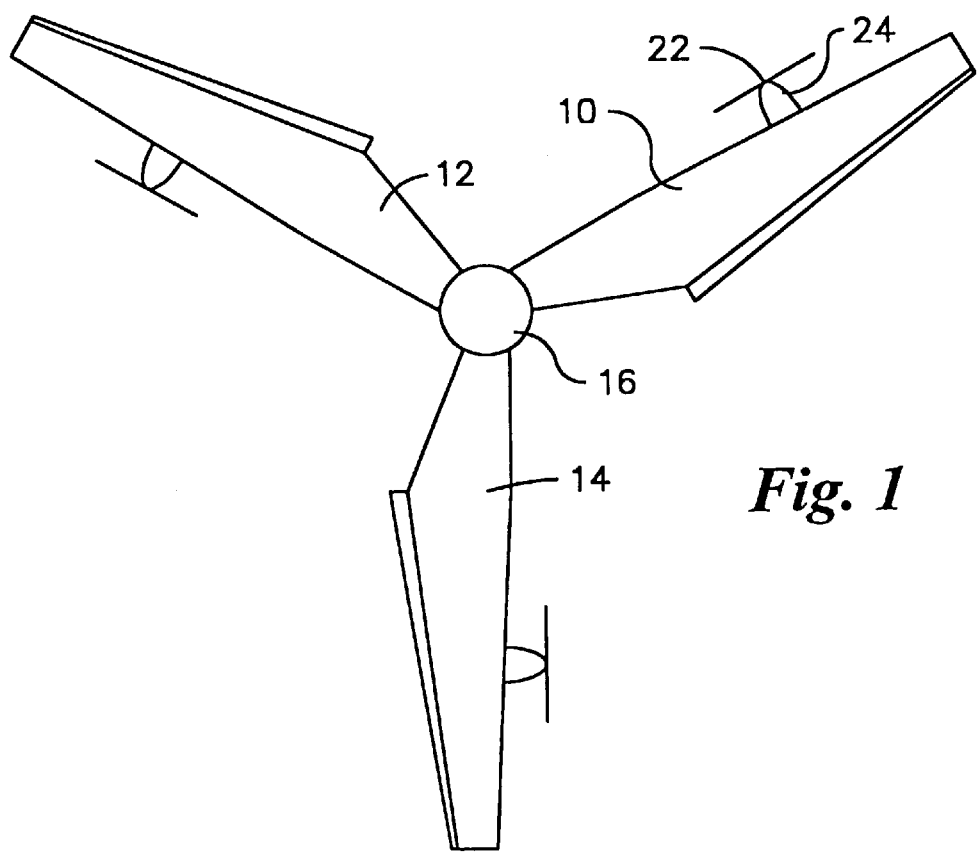
FIG. 1 is a top plan view of a hovering aircraft in accordance with the invention.
Figure 2:
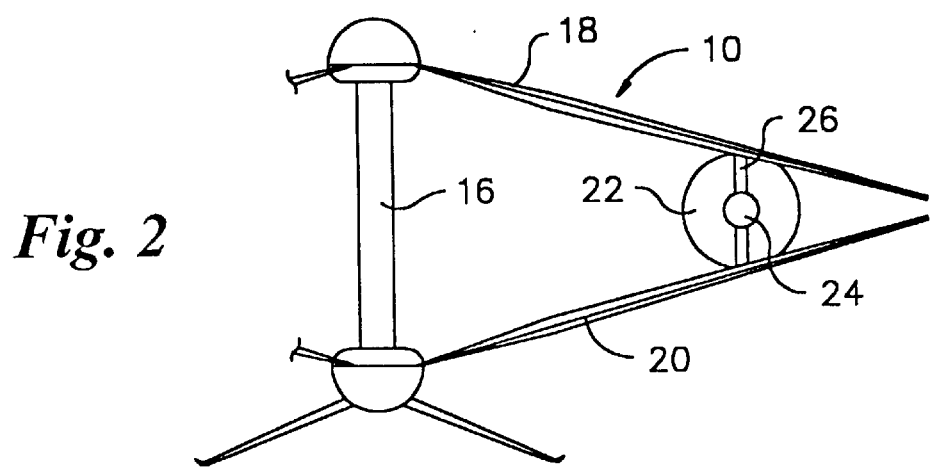
FIG. 2 is a fragmentary elevational view thereof.

FIGS. 1 and 2 show an aircraft having three blade pairs 10, 12 and 14 mounted for rotation about a central vertical support 16, which may be attached to a cab (not shown) as in the case of U.S. Pat. No. 5,082,205, the disclosure of which is incorporated by reference.

Blade pair 10 comprises an upper blade 18 and a lower blade 20, having a thrust-producing propeller 22 on a motor 24 mounted on a strut 26 between the blades at a location radially spaced from the central support but inboard from the blade tips. Each of the other blade pairs has a similar propeller.

Figure 3:
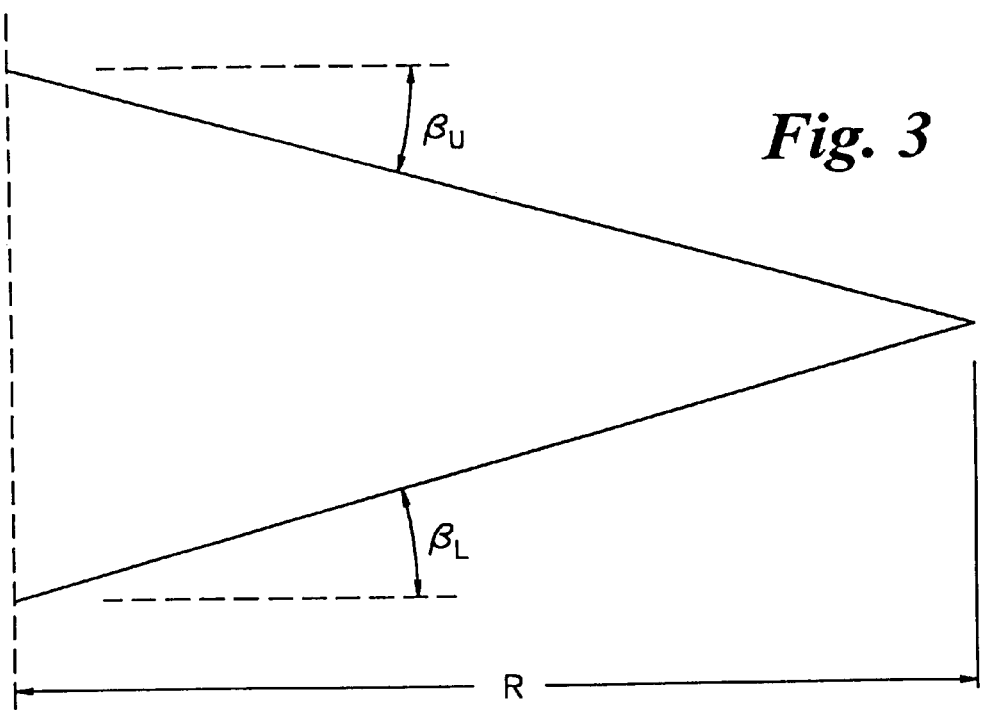
FIGS. 3–8 are diagrams illustrating the operation of the aircraft.

In its original conception, the VectoRotor was symmetric about a horizontal axis with upper and lower blades joined at the tips as in FIG. 3. The lower blade is coned through an angle $\beta_L$ and the upper blade is drooped through an angle $\beta_U$, which is negative since the blade is drooped). In FIG. 3, $\beta_U = -\beta_L$, the blades are joined at the tips, and the blades are directly above one another. However, none of these three conditions is essential to the VectoRotor's production of direct force in the horizontal plane. In fact, changes in these three aspects can provide advantages in performance and structural design. These changes are discussed below.

All of the blades have adjustable lift which can be achieved, for example, by blade pitch adjustment, or by incorporating adjustable control surfaces in the blades. Cyclic and collective controls, similar to those of a conventional helicopter, are provided to control vertical and horizontal thrust as well as roll and pitch moments.

The specifications of blade airfoil shape and planform are design variables as in the case of a conventional helicopter rotor. The power plant can be tip-driven as shown in FIGS. 1 and 2, or powered from the non-rotating support as in a conventional helicopter. Especially in the latter configuration, an anti-torque device such as a helicopter tail rotor is required. The blades can be joined at a radial location inboard of the tips while still taking advantage of the bracing provided by the structural triangulation effected by this joining.

Figure 4:
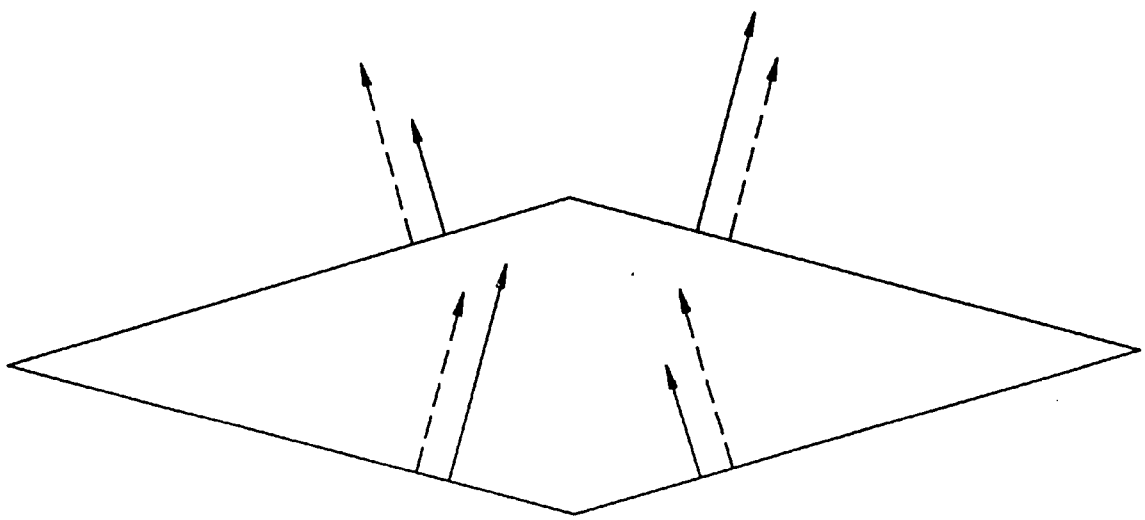

FIG. 4 is a cross-sectional schematic of the VectoRotor with arrows representing the net aerodynamic force on each blade. The dashed arrows show the trimmed case with zero net lateral force and zero net rolling moment. Solid arrows show forces modulated to produce a net force to the right while maintaining the same net vertical thrust as in the trimmed case with zero net rolling moment. In the trim case, force vectors on the upper and lower rotors are shown as equal. In actuality, differential collective pitch between upper and lower rotors would be used to distribute these forces to produce the required thrust while optimizing performance.

Figure 5:
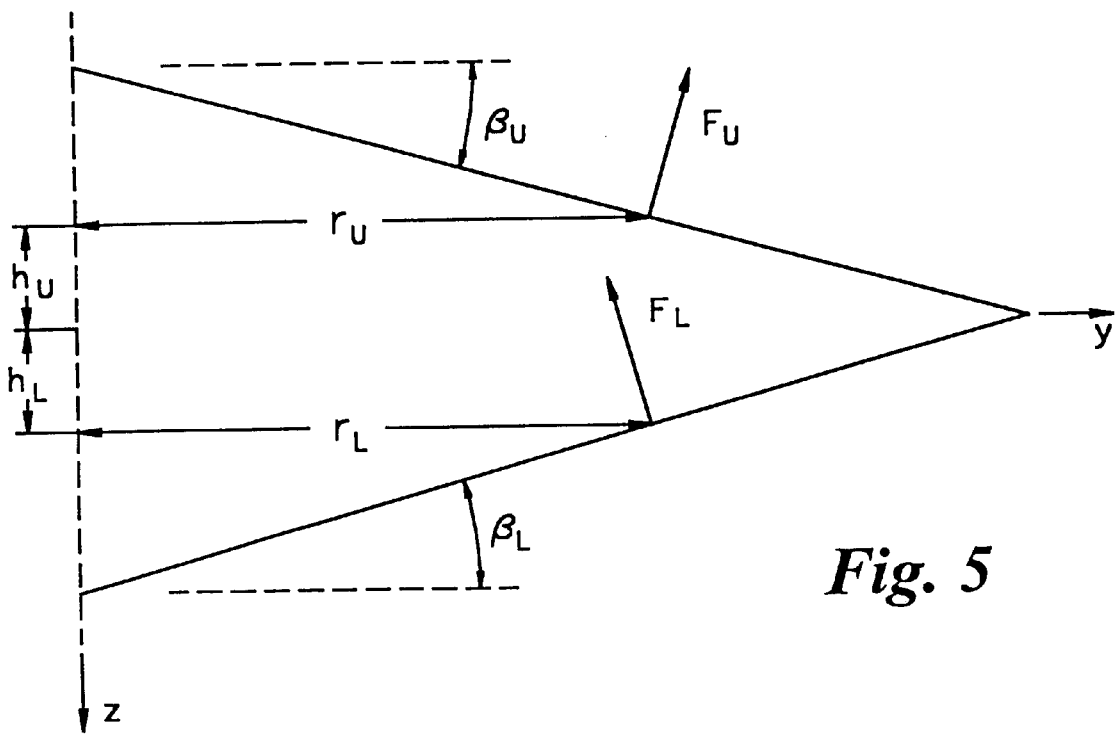

FIG. 5 is a rear view of one blade pair (half of FIG. 3) where $F_U$ and $F_L$ are net aerodynamic forces in the x-y plane, $r_U$ and $r_L$ are radial locations of the blade aerodynamic centers, and $h_U$ and $h_L$ are the vertical locations of the blade aerodynamic centers. Both $\beta_U$ and $h_U$ have negative values. The equations for vertical force, lateral force and roll moment are:

Vertical Force=$(F_U \cos \beta_U + F_L \cos \beta_L)$

Lateral Force=$-(F_U \sin \beta_U + F_L \sin \beta_L)$

Roll moment=$(F_U h_U \sin \beta_U + F_L h_L \sin \beta_L) - (F_U r_U \cos \beta_U + F_L r_L \cos \beta_L)$ where vertical force is positive up, lateral force is positive to the right and roll moment is positive for the right tip moving downward.

In the case where $\beta_U=-\beta_{L'}$, $h_U=-h_L$ and $r_U=r_{L'}$, these equations become:

Vertical Force=$(F_U+F_L)\cos \beta_L$

Lateral Force=$-(F_U+F_L)\sin \beta_L$

Roll Moment=$(F_U+F_L)h_L \sin \beta_L - (F_U+F_L)r_L \cos \beta_L$

In this case, equal and opposite changes in $F_U$ and $F_L$ produce a change in the lateral force without changing the vertical force or the roll moment. When viewing the rotor from the side, similar arguments may be made regarding generating forward, or backward, forces without changing the pitching moment or vertical force. Thus, direct force control in the horizontal direction is achieved.

In FIGS. 1–5, the upper blades are drooped by an amount equal to the amount which the lower blades are coned. However, this is not a requirement, and the angles $\beta_U$ and $\beta_L$ can be varied independently, depending upon direct force control requirements, performance and structural considerations.

Figure 6:
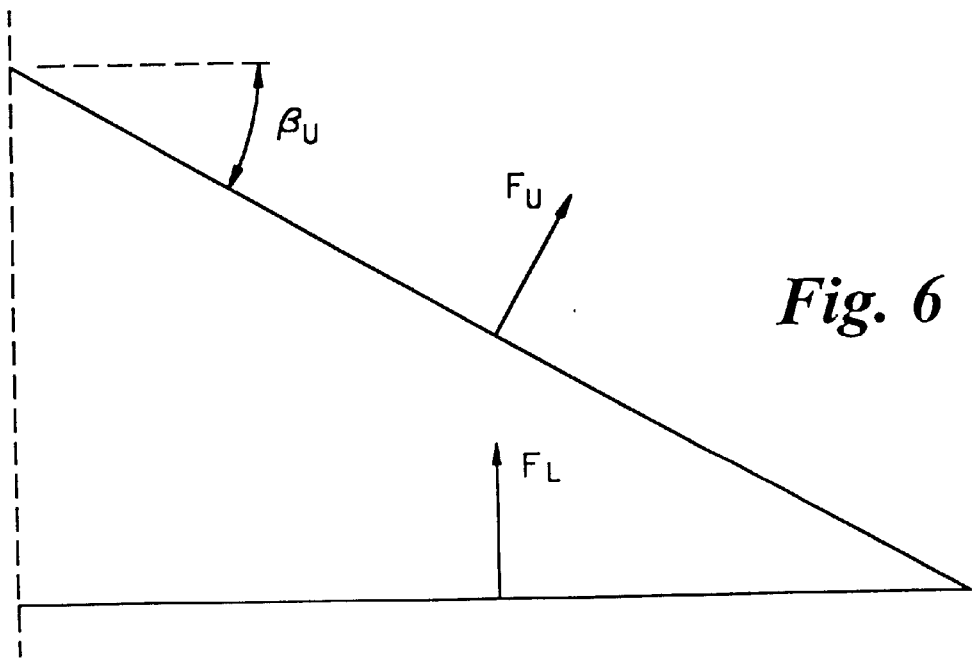
Figure 7:
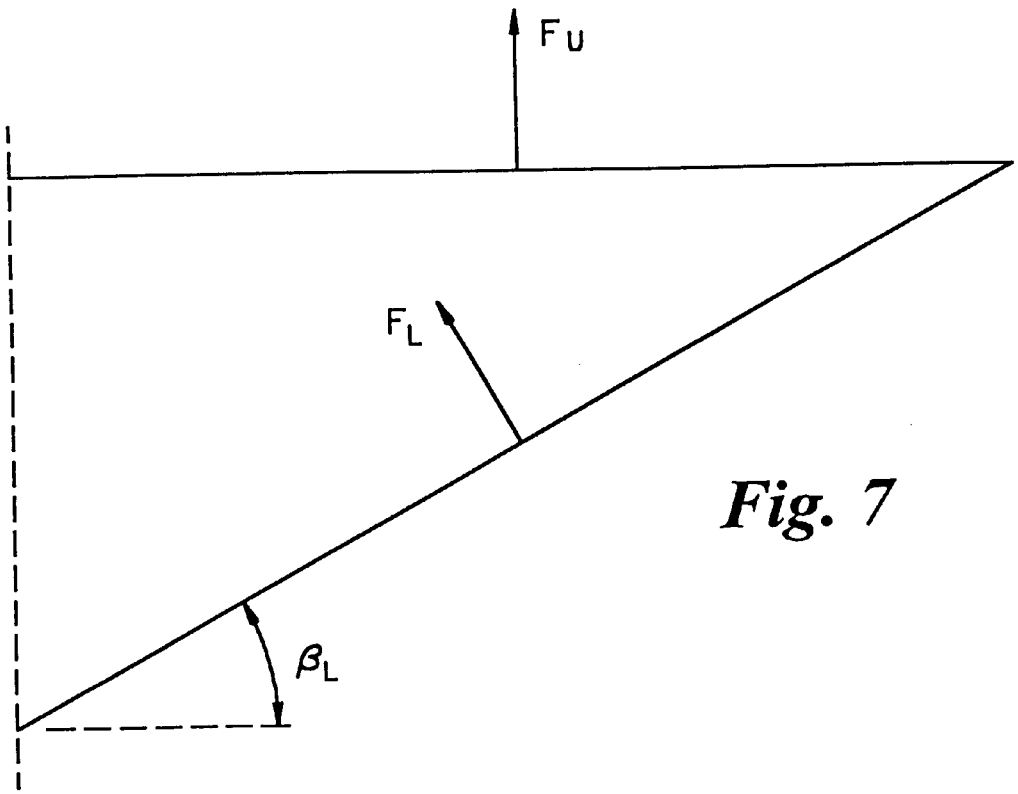
Figure 8:
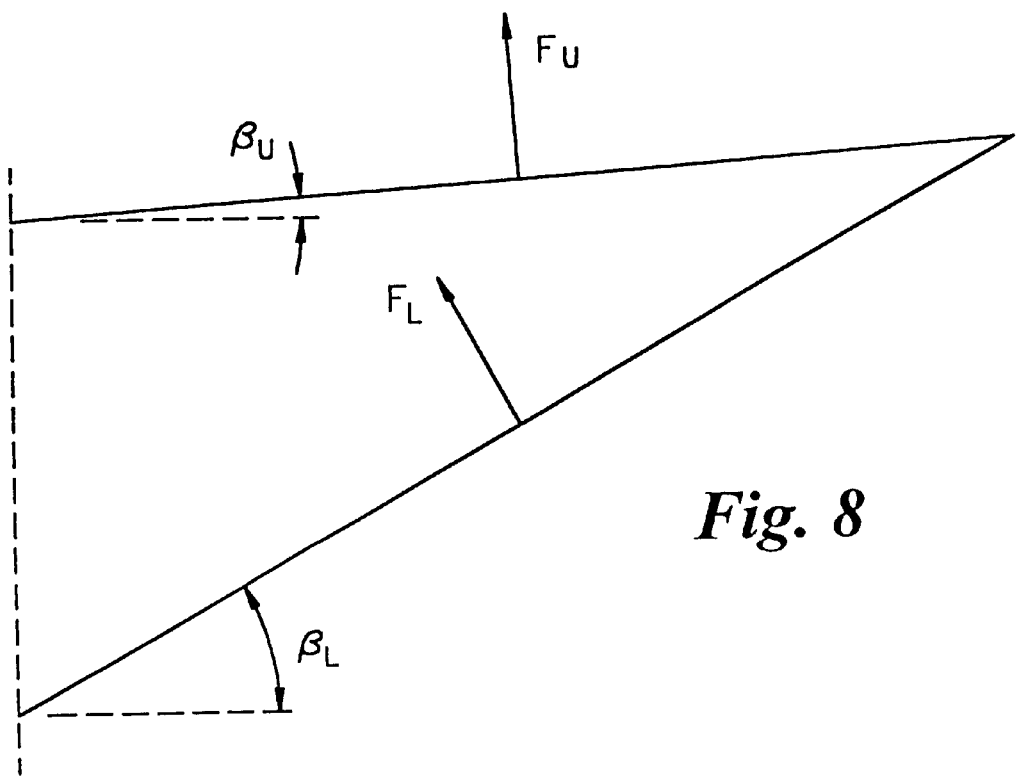

FIGS. 6, 7 and 8 are schematics showing three possible alternative arrangements. In FIG. 6 the lower blade is not coned. ($\beta_L=0°$). In FIG. 7, the upper blade has no droop ($\beta_U=0°$). In FIG. 8, both blades are coned ($\beta_U$ and $\beta_L$ are both positive but not equal).

One consideration in choosing $\beta_U$ and $\beta_L$ is structural design. For the case of a coned rotor blade, flapping moments due to aerodynamic force work to offset flapping moments due to centrifugal force, which eases structural requirements. The opposite is true with a drooped blade. Thus configurations similar to FIG. 7 or 8 would have distinct advantages in this respect over configurations such as that of FIG. 6.

In forward flight of an aircraft having a VectoRotor configuration with blades joined at the tips as shown in FIG. 3 spanwise flow will produce undesirable aerodynamic effects. By appropriate vertical spacing of the blade roots, the tips of the blades can be spaced as shown in FIG. 1. This requires additional structural stiffening, e.g. by vertical struts, which would increase profile power. However, even with the additional structure, the VectoRotor would still possess considerably lower profile power than known alternative configurations.

The upper blades of the VectoRotor are not required to be located directly above the lower blades. Instead, some performance advantages may be realized by constructing the VectoRotor with fore and aft spacing of its upper and lower blades in a manner analogous to the stagger of the upper and lower wings of a biplane. This would entail a combination of upper and lower blade roots staggered in azimuth with blade sweep.

Figure 9:
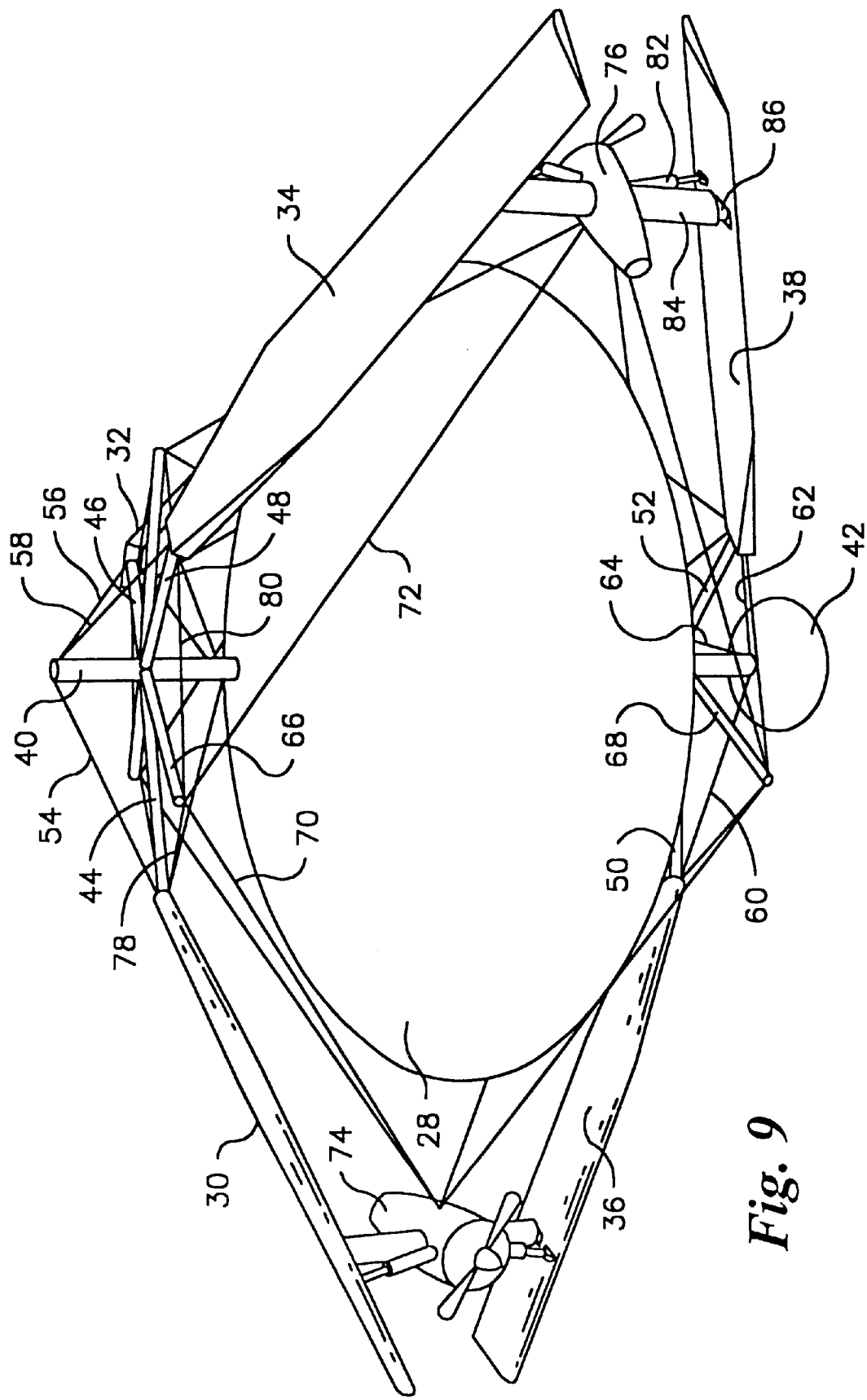
FIG. 9 is a perspective view of a semi-buoyant aircraft in accordance with the invention.

In the semi-buoyant version of the hovering aircraft, as shown in FIG. 9, the rotor structure is similar to that in FIGS. 1 and 2. However, lift resulting from rotation of the rotors is augmented by the buoyant lift of a large, centrally located, helium-filled cell 28.

The rotor structure comprises a set of three upper blades 30, 32 and 34, and a set of lower blades, two of which are seen at 36 and 38. The blades are supported from a large vertical mast 40 which extends through the helium cell 28. The upper and lower sets of blades can be mounted on bearings on the mast so that they can rotate about the mast. Alternatively, the blades can be fixed to the mast and the entire mast can rotate in a vertical passage through the helium cell. In the latter case, thrust bearings (not shown) in the vertical passage sustain the vertical forces exerted by the helium cell on mast 40 and vice versa.

A control cab 42 is mounted at the lower end of the mast 40. In the case in which the blade assemblies rotate relative to the mast and the control cab is fixed to the mast, a rotor (not shown) providing counter-rotating thrust, or another suitable anti-torque device, such as the anti-torque motor described in U.S. Pat. No. 5,082,205, may be provided to prevent the mast, the control cab and the helium cell from rotating with the blades. Similar provisions can be made, in the case in which the entire mast rotates, to prevent the control cab and the helium cell from rotating. The control cab can be provided with a cargo hoist.

The blades are connected to the mast 40 through struts shown at 44, 46, 48, 50 and 52, and these struts are rigidified by cables 54, 56, 58, 60, 62 and 64. Additional struts, e.g. struts 66 and 68, are provided to support cables used to hold the blades in the upper set in fixed relationship to one another and also to hold the blades in the lower set in fixed relationship to one another. For example cables 70 and 72 extend from the tip of strut 66 to the engines 74 and 76, and cables 78 and 80 extend from the tip of strut 66 to the outer ends of struts 44 and 48.

A blade pitch actuator 82 is connected between blade 38 and engine support 84. Blade 38 is connected to engine support 84 through a bearing 86 which allows the actuator 82 to adjust the blade's angle of attack. The other blades have similar blade pitch actuators. These actuators are used to maintain and control both cyclic and collective pitch of the blades for control of vertical lift, pitch and roll, and for propulsion of the aircraft in any desired direction. The separate actuators can be controlled in such a way as to reduce non-first harmonic components of airload, thereby reducing vibrations in the aircraft.

Fuel may be delivered to the engines from a centrally located fuel tank through the blades. Alternatively, the motors can be electric motors or fluid motors receiving electric or fluid power from a centrally located generator or pump.

The aircraft of FIG. 9 operates on the same principles as the aircraft of FIGS. 1 and 2, except that the aerodynamic lift produced by rotation of the blades is augmented by the buoyant lift of the helium cell. The additional lift increases the payload and decreases fuel costs. Moreover, the buoyant lift provides support for the rotor structure while the aircraft is on the ground.

The rotor structure comprising a coned set of lower blades and a drooped set of upper blades lends itself particularly well to use with a buoyant gas cell. The blades of the upper set can have their tips located below the level of the uppermost part of the gas-containing cell, and the blades of the lower set can have their tips located above the level of the lowermost part of the gas-containing cell. A large gas cell can be situated between the upper and lower sets of blades without interfering with their rotation, and without seriously impairing their aerodynamic performance.

We claim:

1. A hovering aircraft having an airfoil blade structure rotatable about a vertical axis, the blade structure comprising a set of upper blades and a set of lower blades, all having variable lift, each of said blades having a root and a tip, the root and tip moving substantially in horizontal circles about said vertical axis as the blade structure rotates, the root of each blade being closer than the tip to said vertical axis, and the upper blades converging toward the lower blades from root to tip, so that the vertical spacing between the roots of the upper and lower blades is greater than the vertical spacing between the tips of the upper and lower blades.

2. A hovering aircraft having an airfoil blade structure rotatable about a vertical axis, the blade structure comprising a set of upper blades and a set of lower blades, all having variable lift, the upper blades converging toward the lower blades from root to tip, and also having interconnecting means for connecting each upper blade with a lower blade, the interconnecting means being at a location spaced inwardly toward said vertical axis from the tips of the upper and lower blades which it interconnects.

3. A hovering aircraft according to claim 2, in which the interconnecting means maintains the tips of the upper and lower blades which it interconnects at a sufficient spacing from each other to reduce interference effects.

4. A hovering aircraft according to claim 1 having a cell containing a lighter-than-air gas located between the upper and lower sets of blades.

5. A hovering aircraft having a support extending along a vertical axis, an airfoil blade structure rotatable about said vertical axis, the blade structure comprising a set of upper blades, each upper blade extending outwardly from said vertical axis and being connected to said support, and a set of lower blades, each lower blade also extending outwardly from said vertical axis and being connected to said support, all the blades of the upper and lower sets having variable lift, and the upper blades converging toward the lower blades from root to tip.

6. A hovering aircraft according to claim 5 having interconnecting means for connecting each upper blade with a lower blade, the interconnecting means being at a location spaced inwardly toward said vertical axis from the tips of the upper and lower blades which it interconnects.

7. A hovering aircraft according to claim 5 having interconnecting means for connecting each upper blade with a lower blade, the interconnecting means being at a location spaced inwardly toward said vertical axis from the tips of the upper and lower blades which it interconnects, and maintaining the tips of the upper and lower blades which it interconnects at a sufficient spacing from each other to reduce interference effects.

8. A hovering aircraft according to claim 5 having a cell containing a lighter-than-air gas located between the upper and lower sets of blades.

9. A hovering aircraft according to claim 5 in which the blades of the upper set are drooping blades and in which the blades of the lower set are coned blades, and having a cell containing a lighter-than-air gas located between the upper and lower sets of blades, the blades of the upper set having tips located below the level of the uppermost part of the gas-containing cell, and the blades of the lower set having tips located above the level of the lowermost part of the gas-containing cell.

* * * * *